United States Patent [19]

Yoshino

[11] Patent Number: 5,078,944
[45] Date of Patent: Jan. 7, 1992

[54] METHOD FOR MAKING PERMANENT MAGNET TYPE DEMAGNETIZING HEAD

[75] Inventor: Tuyoshi Yoshino, Kameoka, Japan

[73] Assignee: Matsushita Electric Industrial Co., Ltd., Kadoma, Japan

[21] Appl. No.: 533,959

[22] Filed: Jun. 6, 1990

Related U.S. Application Data

[60] Continuation of Ser. No. 412,179, Sep. 25, 1989, abandoned, which is a division of Ser. No. 222,045, Jul. 21, 1988, abandoned.

[30] Foreign Application Priority Data

Nov. 2, 1987 [JP] Japan .................................. 62-277618

[51] Int. Cl.$^5$ .............................................. G11B 5/42
[52] U.S. Cl. ...................................... 264/254; 29/603; 264/272.16; 360/122
[58] Field of Search .................... 29/603; 360/66, 118, 360/122, 129; 264/250, 254, 272.16; 425/359-361, 185, 588

[56] References Cited

U.S. PATENT DOCUMENTS 4,706,145 11/1987 Hirabayashi et al. ............... 360/118

FOREIGN PATENT DOCUMENTS 61-204817 9/1986 Japan .
62-141617 6/1987 Japan .

Primary Examiner—Carl E. Hall
Attorney, Agent, or Firm—Cushman, Darby & Cushman

[57] ABSTRACT

A permanent magnet type demagnetizing head is made by successively molding a resin-magnet which forms a body having a magnetic member forming a part of a tape contact surface and a resin which forms protection member forming a remainder part of the tape contact surface, and therefore a manufacturing process is simplified, and further quality of the demagnetizing head is improved, since size precision is enhanced.

4 Claims, 6 Drawing Sheets

METHOD FOR MAKING PERMANENT MAGNET TYPE DEMAGNETIZING HEAD

This is a continuation of Application Ser. No. 07/412,179, filed Sept. 25, 1989, which was abandoned upon the filing hereof and which was a divisional of U.S. Ser. No. 07/222,045 filed July 21, 1988, now abandoned and refiled Mar. 23, 1990 U.S. Ser. No. 07/498,478.

FIELD OF THE INVENTION AND RELATED ART STATEMENT

1. Field of the Invention

The present invention relates generally to a magnetic head and particularly to a permanent type demagnetizing head to be mainly used for erasing data recorded in a magnetic tape for an audio equipment or the like.

2. Description of the Related Art

As a method for erasing data recorded in a magnetic recording medium such as a magnetic tape, there are several methods such as a current-demagnetization method, a permanent-magnet demagnetization method and a method of combination of both of them. In the following, a permanent magnet type demagnetizing head (hereinafter referred to as demagnetizing head) is explained with reference to the attached drawings. FIG. 1 shows a plane structure of the demagnetizing head, and FIG. 2a and 2b show a principle of demagnetization.

As shown in FIG. 1, in the conventional demagnetizing head, a magnetic material 22 prepared by shearing work is inserted in and bonded to a housing 21. Thereafter, corner portions 22a of the magnetic material 22 protruding from the housing 21 are worked into round shape and a surface thereof is made smooth to improve a contact-ability and slidability to the tape. Thus, a tape contact surface 23 is formed. The housing 21 has a mounting hole 24 which is bored through the housing 21.

As shown in FIG. 2a and 2b, the tape contact surface 23 of the magnetic material 22 is magnetized in a manner that a magnetized pattern is alternations of N-pole and S-pole in a tape running direction and strength of magnetic field is gradually reduced in the tape running direction. That is, the magnetic pattern is of the gradually reduced alternation type. In order to demagnetize the magnetic tape (/or erase the data recorded in the magnetic tape), the magnetic tape is made to slide on the tape contact surface 23, and as a results, the magnetic field strength of the magnetic tape is lead to a magnetically neutral point by the gradually reduced alternating magnetic field of the head, thereby demagnetizing the magnetic tape. However, the conventional permanent magnet type demagnetizing head and the method for making the same involve the following problems:

Manufacturing cost is high, since it requires an assembly process comprising working the magnetic material such as the permanent magnet into predetermined size followed by the insertion into and bonding to in the housing 21 and further by grinding and polishing to form the tape contact surface.

There is further problem in the quality, since when the magnetic material 22 is inserted into and bonded to the housing 21, an aperture is brought about between the magnetic material 22 and the housing 21 thereby to cause deterioration of characteristic of the demagnetizing head.

OBJECT AND SUMMARY OF THE INVENTION

The object of the present invention is to provide an improved permanent magnet type demagnetizing head and a method for making the same, which solve the above-mentioned problems and realize reduction of manufacturing cost and improvement of quality.

This object is accomplished by a permanent magnet type demagnetizing head which comprises a magnetic member forming a part of tape contact surface, the magnetic member being made of resin-magnet, a body forming a mounting part of the permanent magnet type demagnetizing head to audio equipment or the like, the body being also made of the resin-magnet, and a protection member formed around the magnetic member and forming a remainder part of the tape contact surface, the protection member being made of non-magnetic resin.

BRIEF DESCRIPTION OF THE DRAWINGS

FIG. 2b shows the alternating magnetic field of the magnetic pattern shown in FIG. 2a.

DESCRIPTION OF THE PREFERRED EMBODIMENT

In the following, preferred embodiment of the present invention are described with reference to the accompanying drawings.

Figure 1:
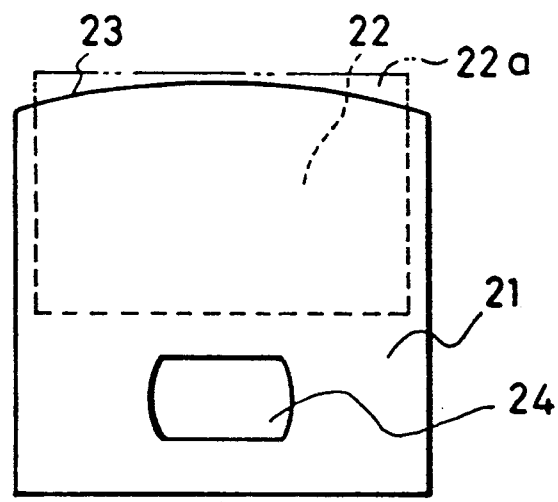
FIG. 1 is a front view showing the conventional permanent magnet type demagnetizing head.
Figure 2A:
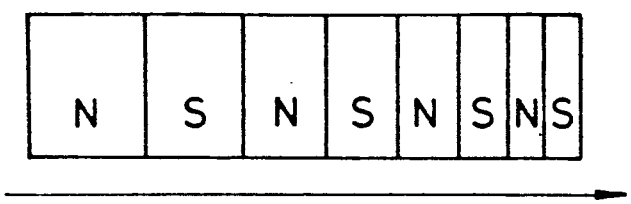
FIG. 2a is a schematic illustration of magnetic pattern of magnetic material.
Figure 2B:
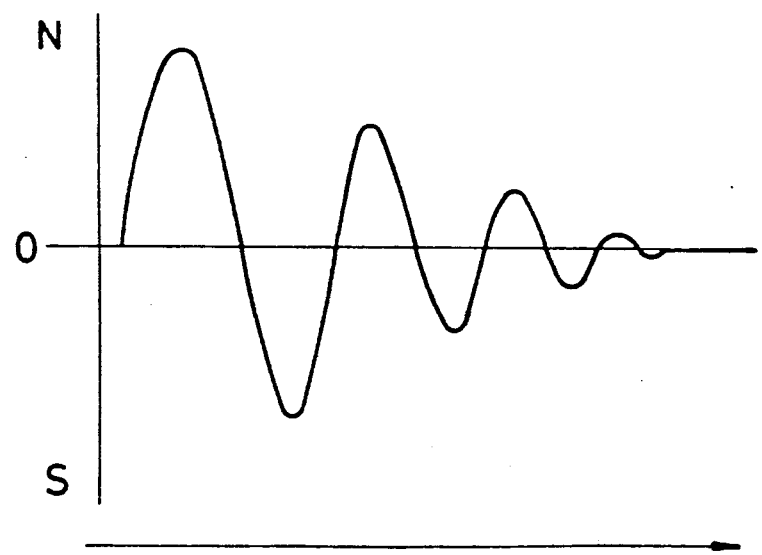
Figure 3A:
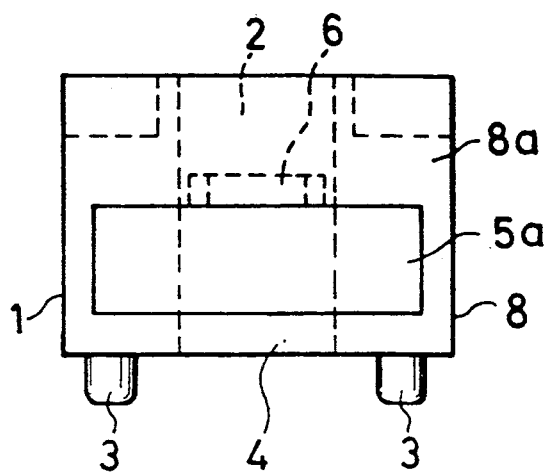
FIG. 3a, FIG. 3b, FIG. 3c and FIG. 4 are a plan view, a front view, a side view, an exploded perspective view, respectively, showing a structure of the demagnetizing head in accordance with the present invention.
Figure 3B:
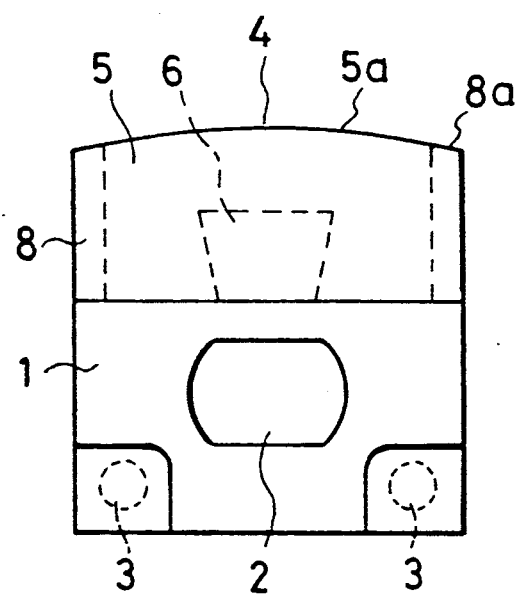
Figure 3C:
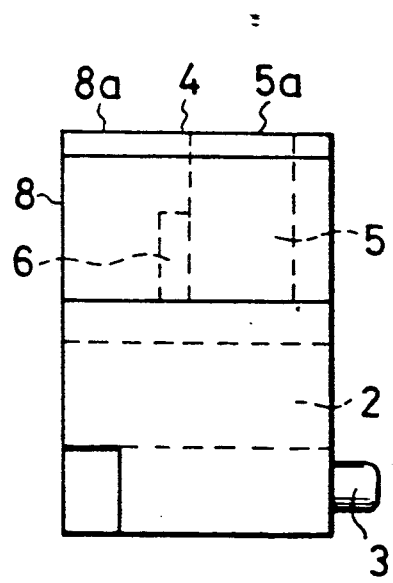
Figure 4:
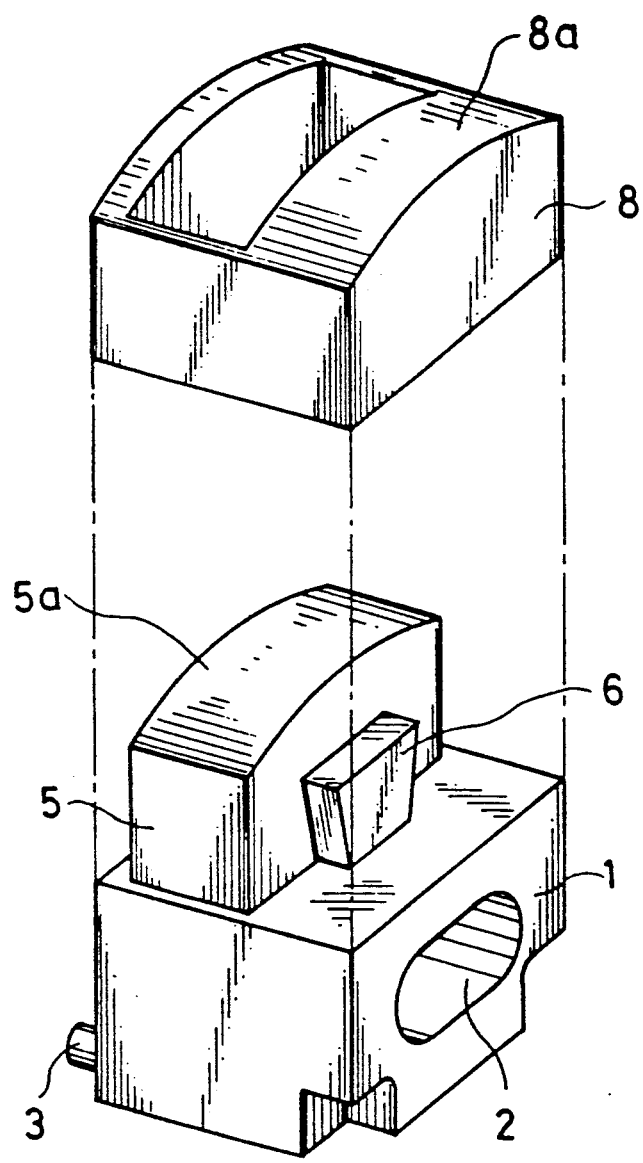

As shown in FIGS. 3a, 3b and 3c, a body 1 of a permanent magnet type demagnetizing head (hereinafter referred to as demagnetizing head) has a mounting hole 2 which extends in a widthwise direction of tape. Further, the body 1 is provided with mounting pins 3 at a back lower part thereof. The body 1 is made of resin-magnet which is a mixture of ferromagnetic material and resin. The demagnetizing head is mounted on an audio appliances or the like by the mounting hole 2 and the mounting pins 3. The demagnetizing head has a tape contact surface 4 formed by a magnetized surface 5a made of a magnetic member 5 and non-magnetized surface 8a made of a protection member 8 made of resin. That is, one face of the magnetic member 5 is formed in a round shape and forms a part of the tape contact face 4 and is magnetized in a predetermined pattern to be necessary for the demagnetizing head; the protection member 8 is formed around the magnetic member 5 by molding the resin, thereby forming the remainder part of the tape contact surface. The magnetic member 5 is provided with an inverted trapezoidal protrusion 6 on a side face thereof for improving bonding strength between the magnet member 5 and the body 1, and one side of the protrusion 6 nearer the tape contact surface 4 is made longer than facing parallel side. In FIG. 4 which shows the demagnetizing head, the protection member 8 is made as separate member from the body 1 to improve comprehension of a structure thereof.

Figure 5:
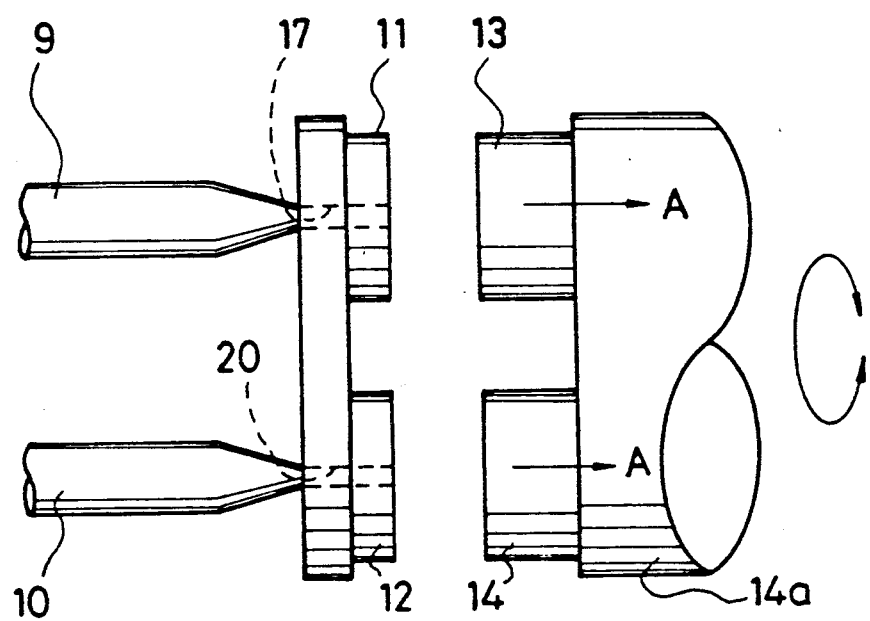
FIG. 5 is a schematic illustration showing a double injection method.
Figure 6A:
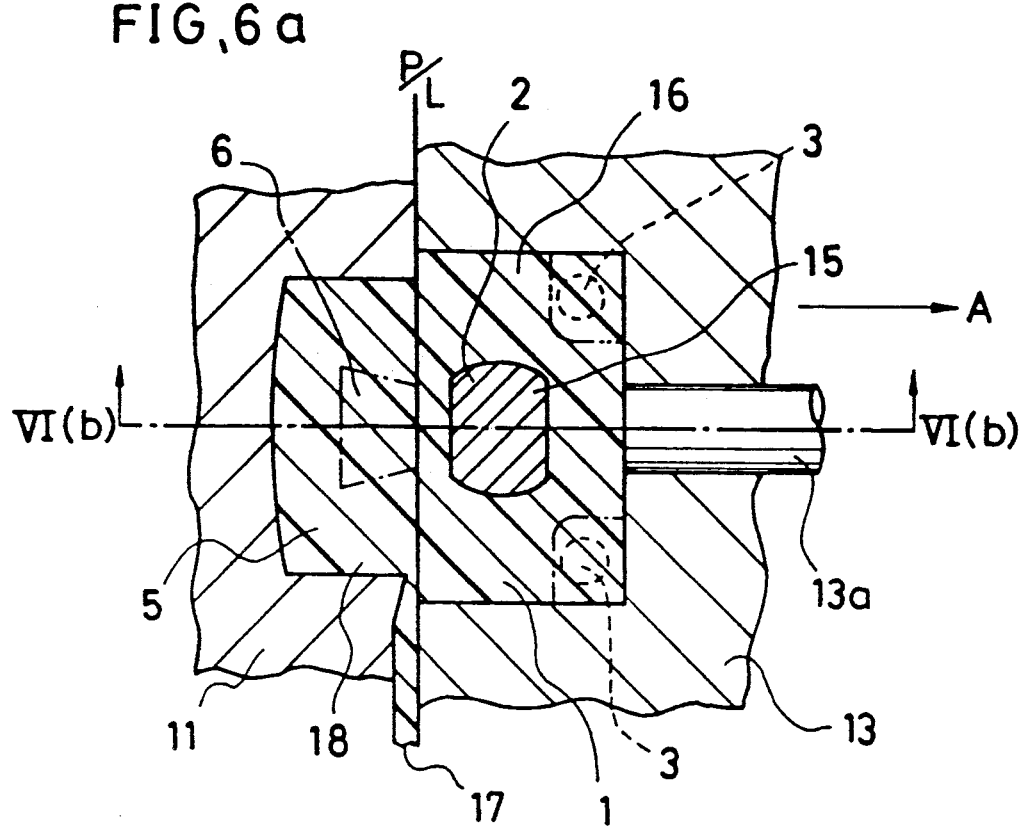
FIG. 6a and FIG. 7a are sectional views showing a method for making the demagnetizing head of the present invention.
Figure 6B:
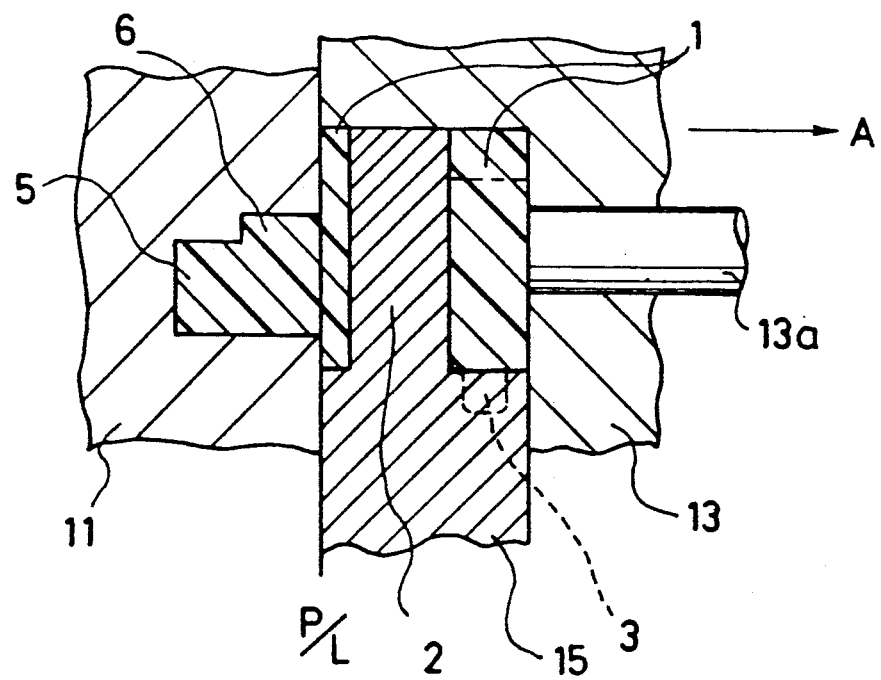
FIG. 6b and FIG. 7b are sectional views by line VIb—VIb of FIG. 6a and line VII—VII of FIG. 7a, respectively.

Next, a method for making the demagnetizing head of the present invention is explained with reference to FIGS. 5, 6a, 6b, 7a and 7b. FIG. 5 shows an outline of double injection method in accordance with the present invention. As shown in FIG. 5, an injection molding machine is provided with 2 sets of a material injection nozzle and metal mold. In order to successively mold two kinds of materials of the resin-magnet and the resin, the resin-magnet is injected from an injection nozzle 9 through an injection port 17, and on the other hand the resin is injected from an injection nozzle 10 through an injection port 20. Movable metal molds 13 and 14 are alternately coupled with the fixed metal molds 11 and 12, respectively, by rotating a metal mold table 14a alternately one direction and counterwise direction by step of 180 degrees. A molding method of the present invention is explained in detail with reference to FIGS. 6a, 6b, 7a and 7b. FIG. 6a shows a front cross-section of the metal molds, and FIG. 6b shows a cross-section by line VIb—VIb of FIG. 6a. In FIGS. 6a and 6b, a symbol P/L shows a parting line whereat the fixed metal mold 11 and the movable metal mold 13 are divided from each other. The movable metal mold 13 is provided with a knock out pin 13a for removing a molded object therefrom. The resin-magnet 18 is injected to a hollow part 16 of the metal mold made by the fixed metal mold 11, the movable metal mold 13 and a slide core 15 through the injection port 17. The resin-magnet 18, for example, is made of 87-91% by weight of magnetic powder such as ferrite magnet containing strontium and 9-13% by weight of thermoplastic resin such as polyamide resin, polyester resin, polypropylene resin, or polyethylene resin. In the above process, the body 1 of the demagnetizing head is formed.

Next, the movable metal mold 13 is pulled backward (direction of arrow A) to separate it from the fixed metal mold 11. Then the movable metal mold table 14a shown in FIG. 5 is rotated 180°, and thereafter, each movable metal molds 13 and 14 are coupled with the fixed metal molds 12 and 11, respectively.

Figure 7A:
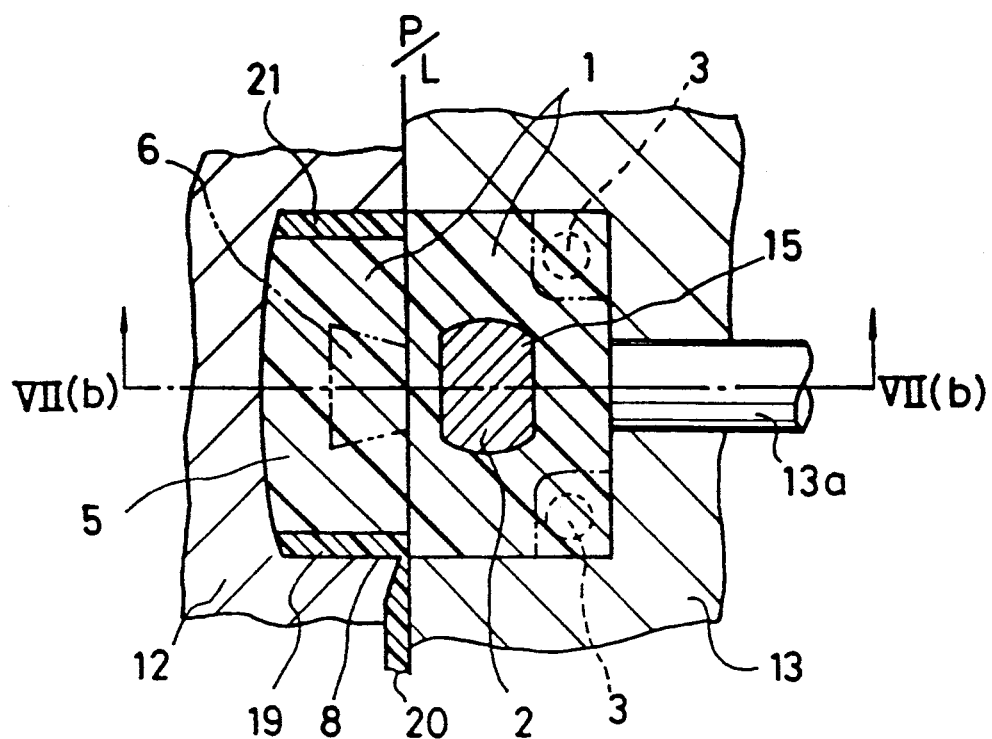
Figure 7B:
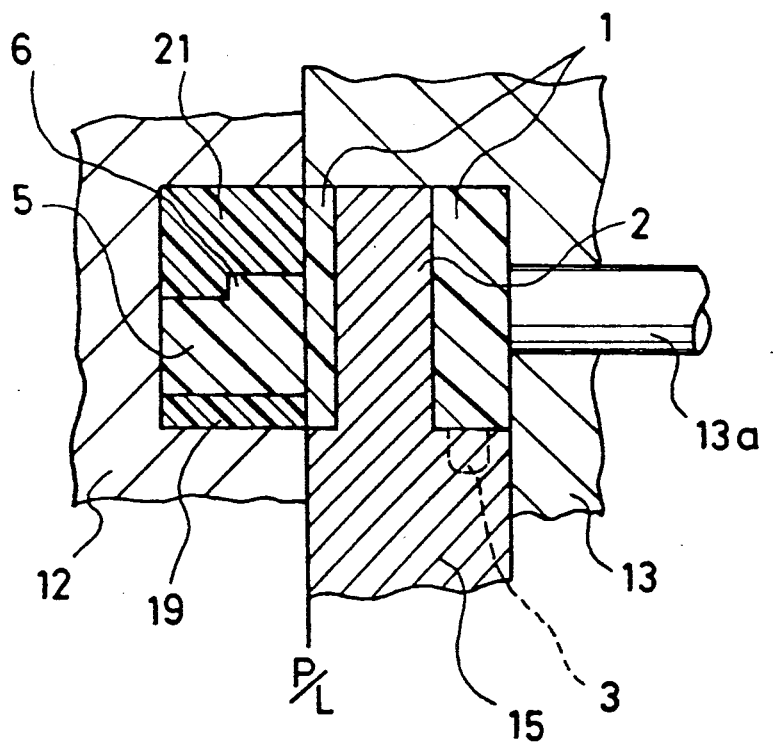

Then, as shown in FIGS. 7a and 7b, in the condition that the body 1 made of the resin-magnet is held in the movable metal mold 13, the fixed metal mold 12 and the movable metal mold 13 are coupled each other at the parting line shown by the symbol P/L, and the thermoplastic resin 21 is injected into a hollow part 19 of the coupled metal molds 12 and 13 through an injection port 20. Examples of the thermoplastic resin 21 are polyamide, polyester, polyproplene and so on. That is, as a remainder part of the tape contact part having non-magnetic property, the thermoplastic resin is filled, thereby forming a protection member 8. In this way, the permanent magnet type demagnetizing head is obtainable.

As mentioned above, in the present invention, the permanent magnet type demagnetizing head is made by using a double injection method. Therefore, the demagnetizing head, wherein a part of the tape contact surface to be magnetized is molded by the resin-magnet and the remainder part thereof to be non-magnetized is molded by the non-magnetic resin, is obtainable without using complicated process. Further, it is not necessary to assemble the demagnetizing head after working the magnetic member into predetermined size and polish the tape contact surface after assembling, since in the present invention, the tape contact surface can be completed smooth in the molding process. As a result, considerable cost down is realized, and furthermore, precision of size is improved thereby to realize high quality demagnetizing head since the magnetic member is molded by using metal mold.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for making a permanent magnet type erasing head having
   a body formed from a resin-magnet material, said body including
      means for mounting the body to audio equipment and
      a unitary magnet member having an end face defining a first tape contact surface and at least one side face defined in a plane substantially perpendicular to a plane of said first tape contact surface, said unitary magnet member having a protrusion extending from said side face in a direction substantially perpendicular to said plane of said at least one side face, said protrusion including a relatively large portion and a relatively small portion, said relatively small portion being spaced from said plane of said first tape contact surface a distance greater than a predetermined length; and
   a protection member formed from a non-magnetic resin material around said magnetic member with said protrusion, said protection member having an end face defining a second tape contact surface coplanar with and surrounding said first tape contact surface, said protection member interlocking with said protrusion so as to fix said protection member with respect to said magnet member;
   comprising the steps of
   first injecting said resin-magnet material from a first injection nozzle to a space formed by a first movable metal mold and a first fixed metal mold for forming said body,
   decoupling a metal mold table having said first movable metal mold and a second movable metal mold from an injection block having said first fixed metal mold and a second fixed metal mold,
   rotating said metal mold table to align said first movable metal mold and said second fixed metal mold,
   coupling said metal mold table to said injection block, and
   secondly injecting said non-magnetic resin material from a second injection nozzle into space formed by said first movable metal mold and said second fixed metal mold for forming said protection member.

2. A method for making a permanent type erasing head in accordance with claim 1, wherein said first injecting step comprises the step of
   forming an erasing head body having a magnetic member which forms a first part of a tape contact surface by molding a resin-magnet, and wherein said second injecting step comprises the step of
forming a protection member around said magnetic member by molding a non-magnetic resin in a manner such that said protection member forms a second part of said tape contact surface.

3. A method for making a permanent magnet type erasing head in accordance with claim 2 wherein;
resin-magnet made of 87-91% by weight of magnetic powder and 9-13% by weight of resin is used for forming said erasing head body.

4. A method for making a permanent magnet type erasing head in accordance with claim 3 wherein;
said resin is thermoplastic resin.

* * * * *